May 21, 1940.  J. R. SKOVERSKI  2,201,352
SWIVEL COUPLING
Original Filed Feb. 14, 1938
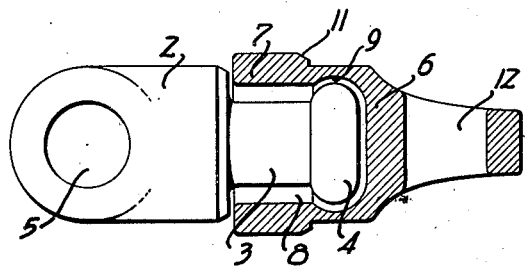
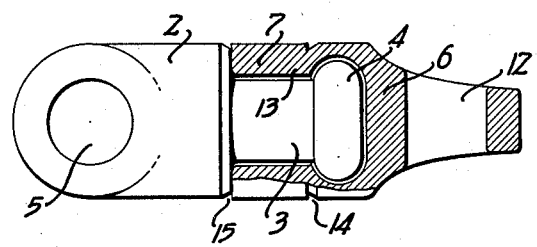
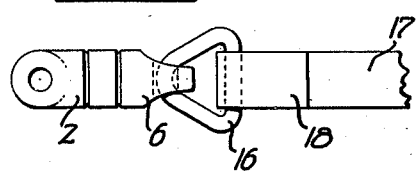
INVENTOR
JOHN R. SKOVERSKI
BY
HIS ATTORNEY Patented May 21, 1940

2,201,352

UNITED STATES PATENT OFFICE 2,201,352

SWIVEL COUPLING

John R. Skoverski, Oakland, Calif., assignor to Joseph Schor, San Francisco, Calif.

Original application February 14, 1938, Serial No. 190,429. Divided and this application April 26, 1939, Serial No. 270,132

3 Claims. (Cl. 59—95)

This is a division of my copending application, Serial No. 190,429, filed February 14, 1938.

My invention relates to swivel couplings; and the broad object of the invention is to provide a coupling of small size capable of carrying large loads.

Another object of the invention is to provide such a coupling which also presents a good appearance and which is easy to make.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a side view, partly in section and partly in elevation, showing the stud and socket members before the socket is compressed about the stud; and Figure 2 is a similar view showing the completed coupling.

Figure 3 is an elevational view showing the coupling attached to a yieldable strap for use in fishing tackle.

In terms of broad inclusion, the coupling embodying my invention comprises stud and socket members connected together to provide a swivel joint. The socket member is originally formed with a recess having a large enough opening to permit insertion of the enlarged end of the stud. After the stud is seated in the recess, the end of the socket member is compressed to close the recess opening sufficiently to hold the stud within the socket.

In greater detail, and referring to the drawing, the swivel coupling embodying my invention comprises a stud member 2 having a reduced neck portion 3 terminating in an enlarged head 4. The latter is relatively flat, giving it the shape of a button rather than a ball. This flattened shape becomes important when the parts are assembled. The stud member also has an eye 5 at the end opposite head 4.

Socket member 6 has a flanged portion 7 providing a recess 8 made wide enough to permit insertion of the enlarged head 4 of the stud, as shown in Figure 1. The inner end of the recess is cut out to provide an enlarged seat 9 shaped substantially complementary to stud head 4. Flange 7 of the socket as originally formed has an outwardly projecting ring 11 extending from the outer edge of seat 9 to the end of the flange. This socket member also has an eye 12 at the end of the coupling opposite eye 5 of the stud member.

These two parts of the coupling may be made of any suitable metal, such as brass; and may be formed by turning in a lathe, or in any other suitable manner. Recess 8 is drilled with a diameter just large enough to permit insertion of stud head 4, and seat 9 is formed with a suitable boring tool.

After the parts are assembled as shown in Figure 1, the flange 7 of the socket member is compressed inwardly about the elongated neck 3 of the stud, thus closing the recess opening sufficiently to hold the stud head 4 within the socket. In this closing operation the metal is deformed and the ring 11 which originally projected outwardly is reduced to the diameter of the socket body. The deformation in the metal forms an inwardly projecting tubular ring 13 extending axially of neck 3 and interposed between head 4 and the body of stud member 2. This is clearly shown in Figure 2. It will be perceived that the ring 11 which was originally formed on the outside of the socket flange has been transposed into a retaining ring 13 on the inside of the flange.

When flange 7 is compressed the seat 9 closes somewhat, and the seat is therefore originally bored oversize (see Figure 1) so that when the flange is compressed to its closed position the walls of seat 9 fit snugly about head 4 yet with sufficient clearance to permit free rotation of the stud. This closing of the seat about the head of the stud without binding is made possible by the flattened shape of the head. If the head were a true sphere it would be difficult to effect the closing without binding against the ball and impair its free swivel action.

The compression of flange 7 to close the socket is preferably accomplished by forcing the assembled coupling through a die of a size equal to the final diameter of the coupling. When ring 11 passes through the die it is thus reduced to the diameter of the coupling. As the ring is pressed in a V-shaped groove 14 is formed about the periphery of the socket member. This groove is not objectionable however and rather adds to the appearance of the coupling. In order to balance this groove the edge of stud member 2 is preferably beveled to form a second groove 15.

The improved swivel coupling of my invention is not only attractive and compact in appearance, but has great mechanical strength. Under a break-down test the coupling failed at another point before the swivel joint pulled apart. Thus with a coupling having an overall diameter of about ⅜ inch, one of the eyes tore out under a pull of over 1200 pounds without dislodging the swivel joint. Such strength in a swivel coupling of small size is highly desirable for many purposes, such as in the stays of aeroplanes. The coupling in larger sizes finds many uses in general rigging, and in smaller sizes is useful for such purposes as fishing tackle.

Figure 3 shows the coupling adapted for use in fishing tackle and having a triangular ring 16 in one of the eyes connected with a strip 17 of rawhide; the latter having an end 18 folded back and fastened in any suitable manner to provide a loop. The other end of the strap has a similar ring so that the unit may be interposed between the line and leader. Rawhide strap 17 when wet is capable of considerable stretching under tension, and therefore provides a flexible link adapted to take up the shock of sudden jerks on the line.

I claim:

1. A socket member for a swivel, comprising a body having a bore for receiving a headed stud and adapted to be compressed to hold the stud head within the socket, the inner portions of said body being undercut to provide a seat for the stud head when the body is compressed, said body having thickened walls adjacent its outer end to form an external ring adapted to be compressed into an internal retaining ring ahead of said undercut seat.

2. A socket member for a swivel, comprising a body having a bore for receiving a headed stud and adapted to be compressed to hold the stud head within the socket, the inner portions of said body being undercut to provide a seat for the stud head when the body is compressed, said body having thickened walls adjacent its outer end to form an external ring adapted to be compressed into an internal retaining ring ahead of said undercut seat, said external ring extending from the undercut portions to the end of said body.

3. A socket member for a swivel, comprising a body having a bore for receiving a headed stud and adapted to be compressed to hold the stud head within the socket, the outer portions of the bore being cylindrical and the inner portions being enlarged to provide a seat for the stud head when the body is compressed, said body having thickened walls adjacent its outer end to form an external retaining ring adapted to be compressed into an internal retaining ring ahead of said seat.

JOHN R. SKOVERSKI.